United States Patent
Linden et al.

(10) Patent No.: US 7,315,942 B1
(45) Date of Patent: Jan. 1, 2008

(54) NETWORK ELEMENT AND METHOD FOR CONTROLLING ACCESS TO LOW LEVEL COMPUTER SYSTEM SERVICES

(75) Inventors: Mikael Linden, Tampere (FI); Olli Immonen, Helsinki (FI); Mikko Lukkaroinen, Oulu (FI); Piotr Cofta, Gdansk (PL)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/546,439

(22) Filed: Apr. 10, 2000

(30) Foreign Application Priority Data

Apr. 12, 1999 (FI) .................................. 990800

(51) Int. Cl.
*G06F 15/16* (2006.01)
*H04L 9/00* (2006.01)
*G06F 15/177* (2006.01)

(52) U.S. Cl. ................. 713/167; 709/221; 713/193

(58) Field of Classification Search ............. 713/172, 713/173, 176–179, 191, 167; 709/221, 225; 707/10; 717/175, 176, 177, 178
See application file for complete search history.

(56) References Cited

U.S. PATENT DOCUMENTS

| | | | | |
|---|---|---|---|---|
| 5,418,524 A | * | 5/1995 | Fennell ................... | 340/7.41 |
| 5,870,610 A | | 2/1999 | Beyda ..................... | 395/712 |
| 5,935,249 A | * | 8/1999 | Stern et al. .............. | 713/201 |
| 6,009,524 A | * | 12/1999 | Olarig et al. ............ | 713/200 |
| 6,029,196 A | * | 2/2000 | Lenz ....................... | 709/221 |
| 6,058,478 A | * | 5/2000 | Davis ...................... | 713/191 |
| 6,148,387 A | * | 11/2000 | Galasso et al. .......... | 711/203 |
| 6,157,966 A | * | 12/2000 | Montgomery et al. ... | 710/8 |
| 6,223,284 B1 | * | 4/2001 | Novoa et al. ............ | 713/100 |
| 6,230,194 B1 | * | 5/2001 | Frailong et al. ......... | 709/220 |
| 6,250,557 B1 | * | 6/2001 | Forslund et al. ........ | 235/492 |
| 6,330,670 B1 | * | 12/2001 | England et al. ......... | 713/2 |

(Continued)

FOREIGN PATENT DOCUMENTS

EP 848316 A2 * 6/1998

(Continued)

OTHER PUBLICATIONS

Postel et al., RFC 959, "File Transfer Protocol (FTP)," 1985.*

(Continued)

*Primary Examiner*—Matthew Heneghan
(74) *Attorney, Agent, or Firm*—Perman & Green, LLP

(57) ABSTRACT

A solution for controlling activities to be carried out in a network element in a flexible and safe manner. A data transmission network includes a network element, which includes data transfer means for transmitting and receiving data from the data transmission network, which data includes one or more commands: processing means for processing the data provided in a specified format; and control means for modifying the received command into a format required by the processing means. The control means includes a driver the origin of which can be verified with the help of an electronic signature; and one or more functions that control the operation of the processing means, which can only be initiated by the driver the origin of which has been verified with the help of the electronic signature.

12 Claims, 3 Drawing Sheets

U.S. PATENT DOCUMENTS

| | | | |
|---|---|---|---|
| 6,347,398 B1 * | 2/2002 | Parthasarathy et al. | 717/178 |
| 6,493,594 B1 * | 12/2002 | Kraml | 700/19 |
| 6,513,159 B1 * | 1/2003 | Dodson | 717/178 |
| 6,591,418 B2 * | 7/2003 | Bryan et al. | 717/177 |
| 6,609,199 B1 * | 8/2003 | DeTreville | 713/172 |
| 6,795,923 B1 * | 9/2004 | Stern et al. | 713/201 |

FOREIGN PATENT DOCUMENTS

| | | |
|---|---|---|
| EP | 0 961 248 A2 | 4/1999 |
| FI | 104222 B | 11/1999 |
| WO | WO 94/11812 | 5/1994 |
| WO | WO 96/38968 | 12/1996 |
| WO | WO 98/05011 | 2/1998 |
| WO | WO 99/53621 | 10/1999 |

OTHER PUBLICATIONS

European Office Action dated Jul. 27, 2005.

* cited by examiner

NETWORK ELEMENT AND METHOD FOR CONTROLLING ACCESS TO LOW LEVEL COMPUTER SYSTEM SERVICES

FIELD OF THE INVENTION

The present invention relates to data transfer and particularly to a network element of a data transmission network, which network element comprises data transfer means for transmitting and receiving data from the data transmission network, which data comprises one or more commands; processing means for processing the data given in a specified format; and control means for modifying the received command into a format required by the processing means.

BACKGROUND OF THE INVENTION

A functional unit or criterion in connection with electronic equipment, which unit or criterion uses or controls another system or component is generally called a driver. Typically, a driver is formed of a software module, which contains the necessary functionalities for connecting an equipment unit to a system through a specified equipment interface. This mainly means a program entity that relates to the equipment unit by means of which commands given by the system are interpreted and modified into a format understood by the equipment unit, and vice versa.

As the use of wireless terminals is expanding from voice communication into other forms of media and data services, the need for drivers to support functions to be added to a terminal is increasing. It is typical to wireless terminals that they have lower memory capacity and performance than conventional terminals, and this also affects the arrangement of drivers in said environment.

One example of a rapidly grown trend of development is smart card applications used with the help of a wireless terminal. For the use of a smart card, a card reader, wherein a user places the smart card in connection with a service transaction, is connected to a terminal. The user gives the commands relating to the control of the use of the smart card with the help of the terminal's user interface. As necessary, the terminal takes care of the connection to a server that maintains the application, and the terminal comprises a driver that controls the functions relating to the service transaction in the direction of both the server and the card.

Smart card applications that have become common include electronic purses; there already is several service providers related to them. Typically, each purse application has its own low level interface, which is still different depending on which purse application is concerned or what type of card combination is in question. One card may also have several smart card applications, such as customer loyalty application, identity application, etc. It can already now be seen that as the number of applications and equipment manufacturers increases, arranging a separate driver for many different alternatives will cause problems as for the software required in a wireless terminal and the terminal's memory requirement.

Normally, a driver is arranged in a wireless terminal as a machine code, which the equipment manufacturer already includes in the terminal's software at the production stage. This means that the decisions on which smart card applications will be supported are already made at an early stage and substantially by the equipment manufacturer. Different equipment manufacturers may support different applications or even the same equipment manufacturer's different model generations may support different applications, which increases the diversity of the product range and makes it difficult for a user to decide on the alternatives. The software of a terminal is liable to become obsolete and maintaining software versions requires additional work from all parties of the service. In some more advanced models (e.g. NOKIA® 9110 Communicator), there is a possibility of afterwards downloading machine code into the terminal's memory, but in this kind of solution one would correspondingly end up maintaining data on each equipment manufacturer's way of arranging the downloading of the code afterwards. As for a new service provider, an arrangement according to prior art is inconvenient because, in addition to the actual client sales, the service provider has to see to it that as many equipment manufacturers as possible are willing to support the service in question.

SUMMARY OF THE INVENTION

Now, a solution has been found with the help of which a connection can be established between a network element and applications to be implemented in the network element in a flexible way and yet in a manner required to maintain safety. One preferred embodiment is to accomplish support for new smart card applications in a wireless terminal or with the help of an accessory that can be functionally connected thereto.

In a solution according to the invention, the control means of a network element comprise a driver the origin of which can be verified with the help of an electronic signature; and one or more functions that control the operation of processing means, which can only be initiated by the driver, the origin of which has been verified with the help of the electronic signature.

The invention utilises the feature provided by new platforms to transfer bigger amounts of data, particularly program code, over the radio interface. In a solution according to the invention, a driver related to a given application is preferably arranged in a server from where it can be downloaded into the network element that executes the application. The driver is implemented as a byte compiled code and it is stored in the network element (e.g. in the terminal's non-volatile memory, preferably in flash memory). The driver provides a High Level Application Programming Interface (HL-API) of a standard format for the application codes to be executed in the network element, which application codes are preferably downloaded into the network element at the operating stage. In connection with a smart card solution, when transferring data in the direction of the smart card the driver uses Application Protocol Data Units (APDU). A script library, preferably in machine language, is stored in the terminal. In connection with data transfer transactions the driver calls the functions of the script library. The APDU required at any given instant is provided to the function as a parameter.

For maintaining safety, the publisher of a driver preferably equips the driver with an electronic signature with the help of which it can be verified that the byte compiled code that is downloaded is expressly the software published by the publisher. The electronic signature can be verified at the downloading stage of the driver or if desired, for example, in connection with the initiation of the driver. If the driver's origin cannot be verified with the help of the electronic signature, the driver will be rejected.

In a solution according to the invention, a fixed script library preferably stored in a network element at the production stage comprises at least two parts: a standard script library and a restricted script library. The standard script library contains one or more functions, which can be called from any application code. Instead, the functions of the restricted script library can only be utilised by an application code the electronic signature of which has been successfully verified.

The invention makes it easier to support new applications in network elements, for example, arranging support for smart card applications in mobile terminals. A driver can preferably be downloaded into a terminal over the air interface, whereupon due to the byte compiled code and the low level interface of a standard format the same driver is suitable for use in different kinds of terminals, independent of the manufacturer or even the terminal type. The possibility of using a driver stored in a terminal, which driver provides a high level interface of a standard format decreases the size of the application code downloaded over the air and, thus, at the same time the connection time in connection with service transactions. The driver itself can be relatively big in size, but since it can be stored in a terminal, the act of downloading must seldom be carried out. An application programmer does not have to worry about how the applications are implemented on a lower level or in what way the implementations differ from each other or even with what kind of terminal or accessory of the terminal the application is supposed to be executed.

A solution according to the invention is safe, because the functions that potentially endanger safety are concentrated in the driver the publisher of which can always be verified with the help of the electronic signature. In addition, the implementation of those applications in which no functionalities to be implemented with the help of restricted script library data units are required, will also benefit from the accomplished flexibility. For organisations for which providing services is traditionally not very easy in the light of safety aspects, the opportunity provided by the invention to verify the origin of applications on the basis of the signature of the driver used provides an easier way to produce applications that have more demanding safety requirements.

BRIEF DESCRIPTION OF THE DRAWINGS

In the following, the invention will be described in detail by referring to the enclosed drawing, in which.

DETAILED DESCRIPTION

Figure 1:
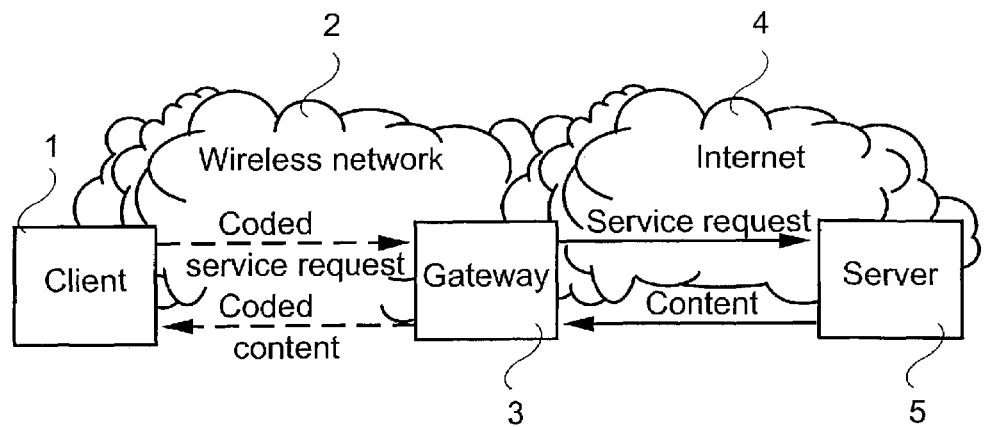
FIG. 1 is a picture in principle of a WAP model (Wireless Application Protocol)

WAP (Wireless Application Protocol) is an arrangement specified by the WAP Forum for implementing access to the Internet and advanced data services in wireless terminals. WAP provides, in principle, a scalable and expandable platform in the layer-structured architecture of which a given protocol layer provides services for a subsequent layer. WAP architecture is very close to the www model known from the Internet, but optimisations and changes required by the wireless environment have been made therein. FIG. 1 is a picture in principle of the WAP model, which enables a negotiation between a client and a server for providing a data object that is stored in the server in a format that can be understood by a reader. A client 1 sends an encoded service request over a wireless network 2 to a gateway 3. The gateway 3 decodes the request and transmits the request through Internet 4 to a server 5. The server 5 sends the requested content to the gateway 3, which encodes the content and sends it to the client 1 that made the service request. The received data object can be written out for the user to examine it through a user interface that is in connection with the client.

Figure 2:
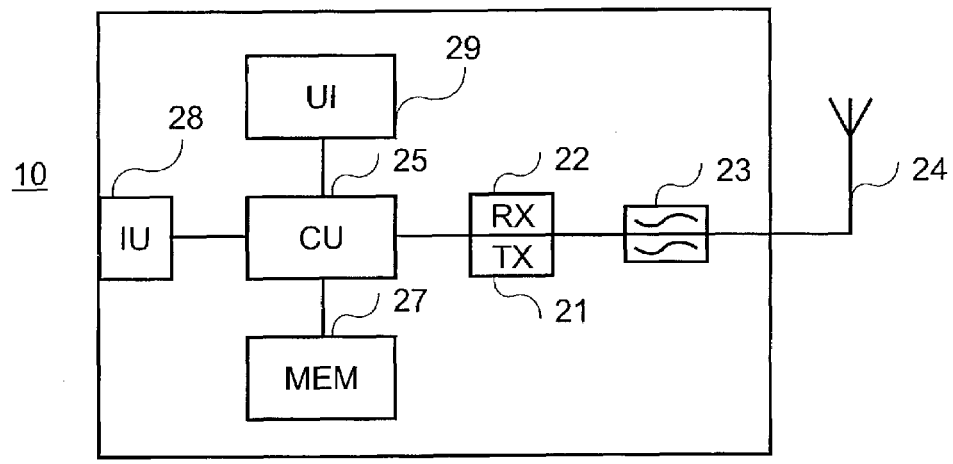
FIG. 2 is a block diagram illustrating a wireless terminal to be used as a client.

The block diagram in FIG. 2 illustrates a wireless terminal that is used as a client. In the presented embodiment, a mobile station is used as a terminal without restricting the invention to the equipment type or terms used. The terminal can be any wireless communication means, such as, e.g. a duplex pager; a wireless PDA (Personal Digital Assistant); a WLAN terminal (Wireless Local Area Network) that uses Internet Protocol (IP); or a portable computer, which is equipped with a mobile network card that comprises an antenna to be added to the equipment port. The mobile station shown as block diagram in FIG. 2 contains a radio unit for communication over the radio path, which comprises a transmitter branch (comprising functional blocks that carry out channel coding, interleaving, encryption, modulation and transmission) 21, known from a conventional mobile station, a receiver branch (comprising functional blocks that carry out reception, demodulation, decryption, de-interleaving, as well as channel decoding) 22, a duplex filter 23 that separates reception and transmission for transmission that takes place over the radio path, and an antenna 24. A central unit 25, which also implements the terminal's functionalities according to the communication protocol, controls the operation of the terminal in full. The mobile station comprises a memory 27, which contains volatile and non-volatile memory, and an interface unit 28, which comprises one or more equipment ports for coupling internal or external accessories to the mobile station. For communication with the user, the terminal comprises a user interface 29, which typically contains a keyboard; a display; a microphone; and a speaker. In connection with smart card applications, the interface unit 28 comprises a card reader through which the central unit 25 communicates with the card placed in the reader. The connection to a server is implemented through the radio unit 21, 22, 23, 24. The central unit 25 controls the implementation of the smart card application by carrying out the functions arranged in the device's memory 27 programmable or by means of hardware structures, and preferably the functions of the application code downloaded from the server into the terminal.

Figure 3:
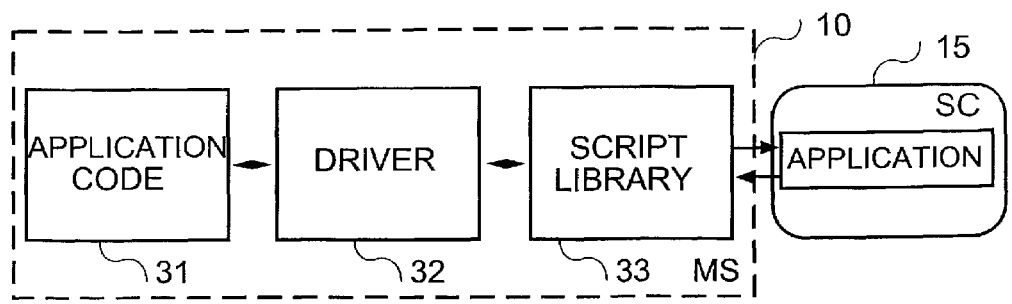
FIG. 3 studies, on a level of principle, an implementation of a smart card application according to the invention, presented according to functionalities.

FIG. 2 showed the structural units of a wireless terminal that acts as a client according to FIG. 1, particularly from the viewpoint of smart card applications. Correspondingly, the functional elements of a solution according to the invention are presented in FIG. 3. The client in FIG. 3 is formed of a wireless terminal 10 and a smart card 15. When the user wants to initiate the smart card application, an application code 31 is downloaded into the terminal 10 from a server. The terminal 10 comprises a driver 32, which initiated on the basis of the downloaded application code calls functions from a script library 33, stored in the device, which functions implement a specified data transfer connection with a specified equipment unit; a smart card 15 in the example of FIG.

3. The data transfer connection is implemented through Application Protocol Data Units (APDU) contained by the functions.

Figure 4:
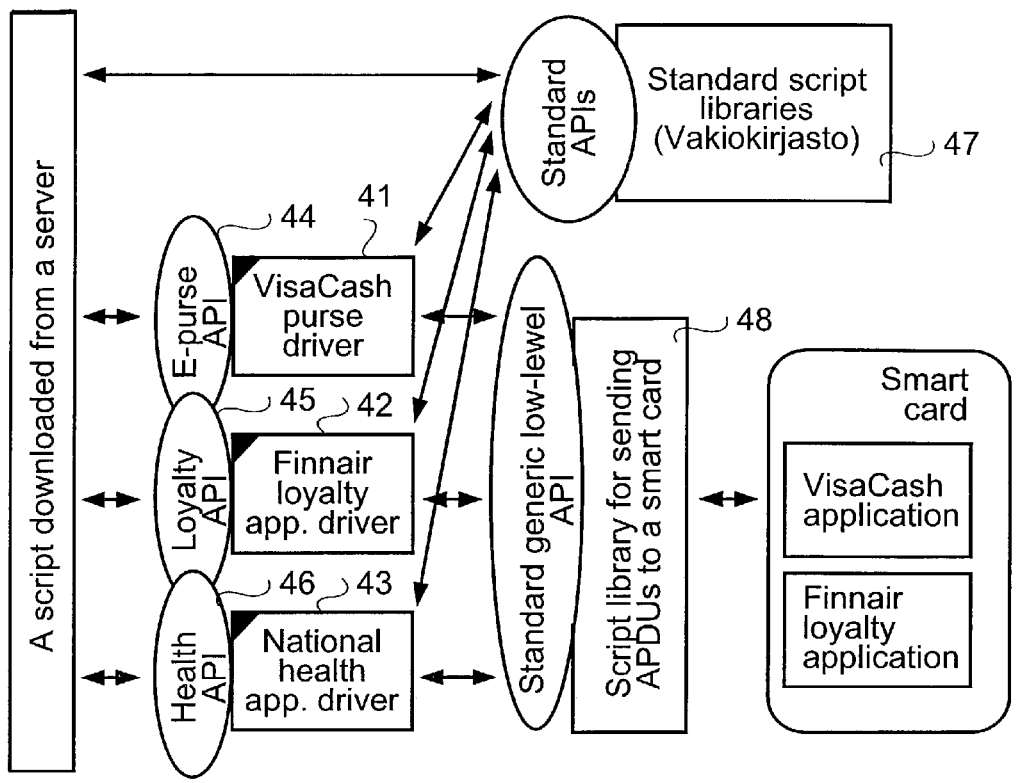
FIG. 4 shows in more detail an arrangement according to the invention for implementing a smart card application in a wireless terminal.

FIG. 4 shows in more detail an arrangement according to the invention for implementing a smart card application in a wireless terminal. One or more drivers 41, 42, 43, stored in the terminal in the form of a byte compiled code, are downloaded into the terminal. In this context, a byte compiled code, i.e. byte code, means a program compiled from a source code. The commands of the byte code can be executed in a virtual machine arranged in the terminal. In this context, a virtual machine means software, which is included in the device's platform and which enables to run the byte compiled code implemented in a language supported by the virtual machine and downloaded into the device. An advantage of a byte-compiled code is that application programmes can be developed irrespective of the application's operating environment. The code is of a standard format and, therefore, at the user end of the application, it should only be taken care of that the correct virtual machine is included in the device's platform.

The best known example of a byte-compiled code is Java, known from the www environment. A WAP application layer WAE (Wireless Application Environment) provides a microbrowser suitable for a limited environment, where the data description language is WML (Wireless Markup Language) and the programming language is WMLScript. For some its characteristics, WMLScript is like the JavaScript programming language, but WMLScript is optimised to function in terminals that use a limited bandwidth and have limited memory and computation capacities.

The drivers 41, 42, 43 provide a High Level Application Programming Interface (HL-API) of a standard format for an application code to be downloaded into the terminal at the operating stage. Preferably, a common interface is determined for different applications intended for the same use, whereupon the party that implements the application using HL-API does not necessarily have to worry about the differences between the applications, and programming becomes easier. For example, in FIG. 4, an interface 44 is an interface of applications relating to an electronic purse; an interface 45 is an interface relating to customer loyalty applications; and an interface 46 is an interface relating to health care applications.

The script library stored in the terminal 10 comprises two parts: a standard script library 47 and a restricted script library 48. The script libraries 47, 48 preferably comprise one or more functions implemented and stored in machine language. In this context, a machine code means a file processed by a compiler from a program in source language, which is ready to be run by the device's processor when called by the device's operating system. The functions of the standard script library 47 according to the invention are basic functions (e.g. functions of the user interface, mathematical functions), which any driver stored in or downloaded into the terminal can call.

A restricted script library 48 comprises functions, which enable transparent data transfer between an application code and the smart card 15. This kind of function can be, for example, sendAPDU(CommandAPDU), which is given the APDU, contained by the driver according to the application code's HL-API command, as a parameter. Thus, there is a generic Low Level Application Programming Interface (LL-API) between the driver and the smart card, and substantially any application code commands relating to the initiated application are transparently transmitted from the driver through the LL-API to the smart card, and vice versa. HL-API facilitates the implementation of the application code, because the application implementator does not necessarily have to know the details of individual solutions; correspondingly, LL-API enables a transparent communication connection between the driver and the smart card, independent of the driver.

However, it is clear that the genericity of the presented arrangement as such contains a potential risk concerning dishonest application providers or application code implementators. A writer of an application code may, for example, include in the code a command to transfer a small amount of money into his one account in connection with each purse transaction. To avoid the safety risk, in an arrangement according to the invention the functions of a restricted script library can only be called by a driver the origin of which has been verified with the help of an electronic signature.

Figure 5:
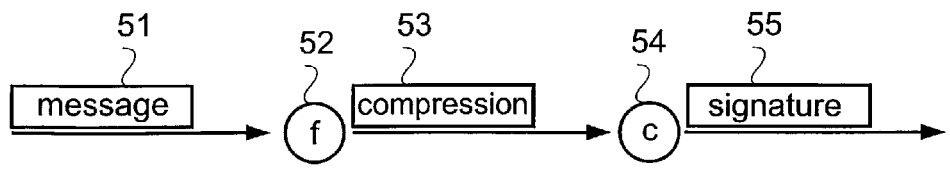
FIG. 5 shows an embodiment of the invention.

In an electronic signature, public key encryption technique is utilised, e.g. RSA algorithm. In addition, in a WAP environment elliptic curves, among other things, are utilised in electronic signatures. Solutions implemented by means of different electronic signing techniques are equivalent as for the invention. In the following, one possible embodiment will be presented with the help of the functional diagram shown in FIG. 5. A message 51 to be signed, i.e. in this case, a driver code in a server is processed by a hash function 52 which, with the help of a specified algorithm (e.g. MD5) computes a fixed-length hash 53 from the message. The hash function 52 is a one-way function and the hash 53 produced by it will change immediately if the original message 51 is changed even a little. The hash 53 is processed by an encryption function 54 using the secret key of the publisher of the driver as the encryption key. The result of the operation is an electronic signature 55, which is added to the driver code. When there is a desire to verify the driver, the signature is first decoded using the public key of the driver's publisher. After this, the driver code is processed by the hash function. If said public key decodes the signature and the decoded character string corresponds to the computed hash, it is known that the driver originates from the desired source and that the code has not been tampered after the publication. The chain of confidence substantially presupposes the transfer of a public key, and the accomplished safety level is very good.

Figure 6:
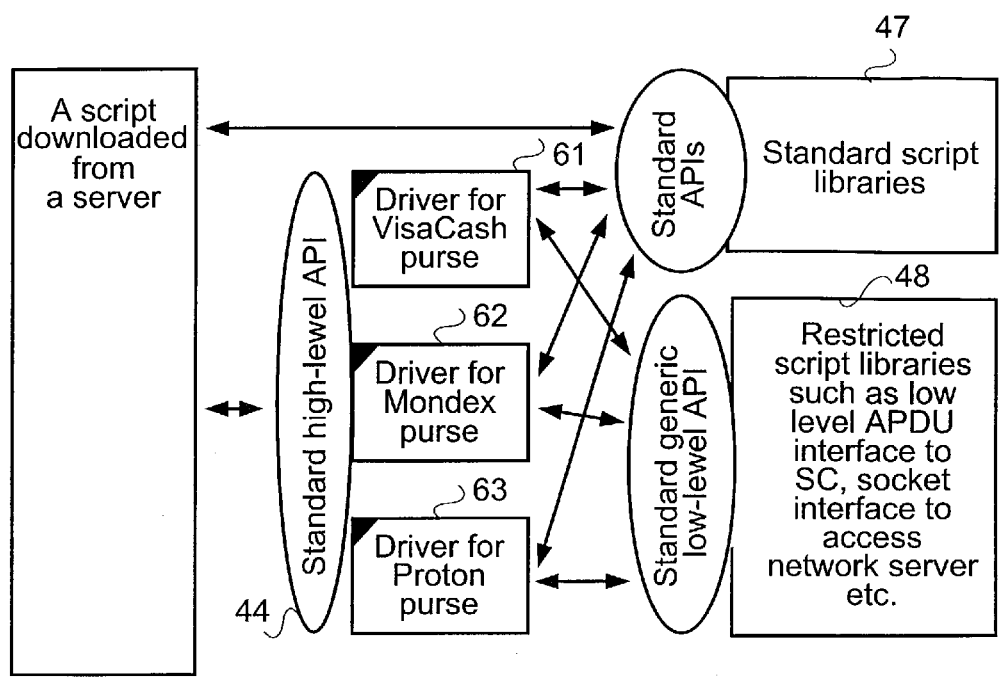
FIG. 6 illustrates an arrangement for executing in a terminal applications intended for a single purpose of use.

FIG. 6 illustrates in more detail an arrangement for implementing terminal applications intended for a single use. In the case shown in FIG. 6, it is a question of an electronic purse, wherein there preferably is a driver 61, 62, 63 for each purse application provider, provided by the provider itself, which can be downloaded into the terminal from a server, when necessary. However, due to HL-API, the application code relating to a payment transaction can be the same for all the different purse applications. A downloaded driver, the authenticity of which has been verified with the help of an electronic signature either in connection with downloading or in connection with a payment transaction, is able to call functions of both a standard script library and a restricted library and, thus, to control the performance of the payment transaction maintaining the safety requirements between the payment server and the smart card.

In the following, the downloading of a driver into a terminal will be examined with the help of an example. A user has made an agreement on smart card bases with a company X that offers a payment application. The company provides the user with a smart card, which contains an electronic purse application XCash. In order to obtain into his terminal the driver relating to the XCash application in question the user, for example:

a) activates his WAP phone, whereto an external smart card reader has been connected. He sends the WAP server of the company X (e.g. by selecting a suitable link) a request to download XCash support into his WAP phone. Or b) pushes a new XCash card into the WAP phone card reader. The card reader, i.e. the terminal, sends the smart card a reset signal and after resetting, the smart card responds by sending an Answer To Reset (ATR) sequence to the card reader. On the basis of the information obtained in the ATR response, the card reader concludes that it is a question of a new cash card application and automatically initiates the downloading of the driver from a server. To be able to initiate downloading, the terminal needs address information in order to be able to locate the server from which the driver can be downloaded. The address (e.g. Universal Resource Locator, URL) may have been stored, e.g. in the smart card itself or in the terminal. One possibility is to arrange in the network a server by which drivers are maintained for different kinds of smart card applications or wherein information (e.g. URL) is stored on the basis of which the terminal finds the correct driver.

By utilising Wireless Application Protocol (WAP), the user sends the server a request to send the selected driver into the WAP phone. The server sends the driver, which contains the electronic signature. The electronic signature can be verified at this stage before storing the driver in the terminal's non-volatile memory (e.g. cache). If the memory space is about to become full, the user may be requested to remove older drivers, left unused.

In the following, the use of a downloaded driver in a terminal will be examined with the help of an example. The user browses by his WAP phone the content in a WAP server and becomes interested in a WML document liable to charge, offered by a company Y. After expressing his willingness to pay the document in question as XCash service, the server transfers a WMLScript application code into the user's WAP phone. The WAP phone's platform contains a WMLScript virtual machine, which begins to execute the downloaded WMLScript application code. In order to initiate the transfer of the sum of EUR 10, the application code gives a HL-API command EPurse.StartPayment("XCash", "EUR" 10, "serverAddress")

which causes the XCash driver stored in the terminal to initiate. The driver controls payment transactions in the terminal by calling, e.g. a function of the standard script library to inquire through a user interface the user's authorisation for the payment and, after obtaining the authorisation, gives a suitable APDU to the XCash card with the help of a function of the restricted library. Correspondingly, the driver controls with the help of the WAP browser the connection to the payment server of the company Y and possibly also the company X taking care of the payment transaction towards the network in a well-known manner. When the company Y has been informed that the payment transaction has been concluded it transfers the desired document over the network into the user's WAP phone.

In the embodiments presented above, LL-API is an interface through which it is possible to send APDUs to a processing device, here to a smart card, to be connected to a terminal. However, a solution according to the invention can also be applied to other environments, where a connection from an application program to a performance means that implements the application should be established flexibly but at the same time, maintaining a sufficient safety level. The performance means can be a processor connected to a network element or an internal processor of the network element. Correspondingly, LL-API can be, e.g. Socket API with the help of which a connection is opened between the application program and a server, which is in the network. Downloading a driver from the network enables flexibility and speed in connection with new applications, and LL-API guarantees that a connection can only be established by a driver the origin of which can be verified. Another embodiment is LL-API of a GPS device (Global Positioning System) to be connected to a terminal, which enables the flexible introduction of applications that utilise positioning at the same time maintaining the possibility of controlling the origin of the application program that obtains location data.

This paper presents the implementation and embodiments of the present invention with the help of examples. A person skilled in the art will appreciate that the present invention is not restricted to details of the embodiments presented above, and that the invention can also be implemented in another form without deviating from the characteristics of the invention. Consequently, for example, a terminal can also be other than the WAP phone presented above. Thus, the possibilities of implementing and using the invention are only restricted by the enclosed claims, and the various options of implementing the invention as determined by the claims, including the equivalent implementations, also belong to the scope of the invention.

The invention claimed is:

1. A network element comprising:
    data transfer means configured to download a driver from a network server via a data transmission network;
    an interface unit configured to transmit and receive data to and from an external unit, to transmit a signal to the external unit, said signal being indicative of attachment of the external unit to the network element, to automatically initiate the downloading of the driver in response to information obtained in a response signal from the external unit, said information indicating the presence of a new application in the external unit, and to obtain from the external unit an address from which the driver is to be downloaded;
    control means configured to check that the origin of the downloaded driver has been verified prior to executing one or more functions in the restricted library;
    wherein said control means comprises:
        said driver configured to modify one or more commands received into a format required by the external unit, to invoke one or more functions in a restricted library in the network element to control the operation of the external unit, invoke one or more functions in a standard library in the network element; and
    wherein an origin of said downloaded driver is verified using at least an electronic signature.

2. A network element according to claim 1, wherein said network element is a wireless terminal.

3. A network element according to claim 1, wherein said driver is stored in the network element as a byte compiled code.

4. A network element according to claim 3, wherein said electronic signature comprises a character string, processed by the secret key of the publisher of said code, whereupon the verification of the driver's origin takes place by decrypting the encryption of the character string by the code of publisher's public key.

5. A network element according to claim 4, wherein said character string comprises a hash computed from said code by a specified hash function.

6. A network element according to claim 1, wherein a driver relating to a specific use is arranged to receive a command in a specified format.

7. A network element according to claim 1, wherein said external unit is a smart card.

8. A data transmission network, comprising a network element, which network element comprises:
- a data transfer device configured to download a driver from a network server via a data transmission network;
- an interface unit configured to transmit a signal to an external unit, said signal being indicative of attachment of the external unit to the network element, to automatically initiate the downloading of the driver in response to information obtained in a response signal from the external unit, said information indicating the presence of a new application in the external unit, to obtain from the external unit an address for the downloading of the driver, transmit and receive data to and from the external unit, which data comprises one or more commands, the external unit processing data provided in a required format;
- a control unit configured to check that the origin of the downloaded driver has been verified prior to executing one or more functions in the restricted library;
- wherein said control unit comprises:
- said driver configured to modify at least one received command into the format required by the external unit, to invoke one or more functions in a restricted library in said network element to control the operation of said external unit, invoke one or more functions in a standard library in said network element; and
- wherein the origin of said downloaded driver is verified using at least an electronic signature.

9. A data transmission network according to claim 8, wherein said network element is a wireless terminal.

10. A data transmission network according to claim 8, wherein said network element is a network server.

11. A data transmission network according to claim 8, wherein said external unit is a smart card.

12. A method for processing data, the method comprising:
- sending to an external unit a signal indicative of attachment of the external unit to a network element;
- receiving a response signal from said external unit to the network element;
- receiving an address from which a driver is to be downloaded from an external unit;
- downloading said driver from a data transmission network to said network element in response to information obtained in a response signal from the external unit, said information indicating the presence of a new application in the external unit;
- verifying an origin of the driver using at least an electronic signature;
- executing an application in the network element;
- the application issuing a command to the driver;
- the driver modifying the command into a format required by an external unit;
- the driver calling a function in a restricted library to control the operation of the external unit; and
- checking that the origin of the driver has been verified prior to executing the function.

* * * * *